July 25, 1967  I. T. KOKOTT  3,332,562
VEHICLE PUSHING AND LIFTING DEVICE FOR ROAD SERVICE VEHICLES
Original Filed Nov. 1, 1963

INVENTOR.
IVAN T. KOKOTT
BY
*Irwin C. Alter*
ATTORNEY

United States Patent Office 3,332,562
Patented July 25, 1967

3,332,562
VEHICLE PUSHING AND LIFTING DEVICE FOR ROAD SERVICE VEHICLES
Ivan T. Kokott, 3041 S. 67th St., Milwaukee, Wis. 53219
Continuation of application Ser. No. 320,796, Nov. 1, 1963. This application May 19, 1966, Ser. No. 556,534
10 Claims. (Cl. 214—86)

My invention relates to pushing devices and more particularly to an automotive accessory employed as a pushing device. This application is a continuation of my co-pending application entitled, "Improvements in Pushing Devices," Ser. No. 320,796, filed Nov. 1, 1963 now abandoned.

The object of my invention is to provide a device that may be mounted onto the front of a tractor, truck, or any other type of automotive vehicle.

Another object of my invention is to provide a device of the character described, that may be adjustably mounted onto the vehicle, and raised and lowered in any conventional manner by mechanical, hydraulic, or pneumatic means, and despite the adjustments maintain the actual pushing bar portion of the pushing device in a plane normal to the ground.

Still another object of my invention is to provide a device that may be easily removed or replaced.

It is manifest to anyone familiar with towing and servicing automobiles or the like, that the position and location of the vehicle being serviced, often times requires pushing or pressure when towing is not practical, and the bumper, or the like on the vehicle being serviced varies in its distance from the ground, or pavement.

The device illustrated, described and claimed herein provides contact members that may be raised, or lowered in any conventional manner, and may be constructed so that the impact or contact members are vertical at all times and despite height adjustments retains the actual pushing bar portion normal to the ground. The device is simple in construction, easy to apply or remove from the vehicle, and adjustable for height at all times, thereby providing a practical and efficient device, suitable for the purpose for which it is intended.

Other and further objects of my invention will become more apparent as the description proceeds, when taken in conjunction with the drawings, in which.

Figure 1:
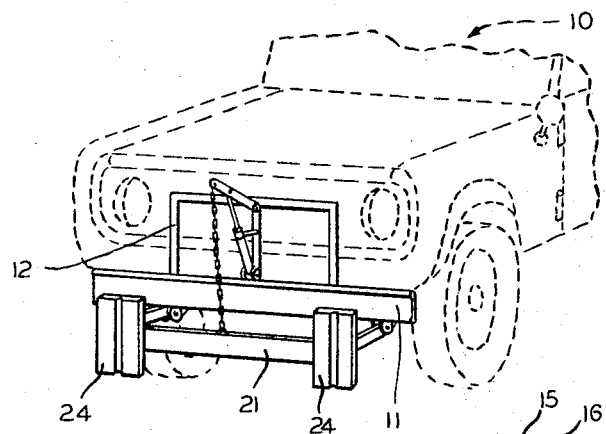
FIGURE 1 is a perspective view of the assembled device mounted on an automotive vehicle shown in phantom.

Similar characters of reference indicate corresponding parts throughout the several views, and referring now to the same, the character 10 shows generally a vehicle (shown in phantom) which is equipped with a conventional horizontal bar 11, attached to the frame of the motor vehicle 10 in any conventional manner.

There is a vertical support assembly shown at 12, extending upward from the horizontal bar 11, which assembly supports a cylinder 13 disposed at an angle, and a reciprocating piston rod 14. The piston rod 14 is pivotally attached at 15 to a lifting bar 16, which is pivotally attached at 17 to the vertical support 12 (see FIGURE 2).

Figure 2:
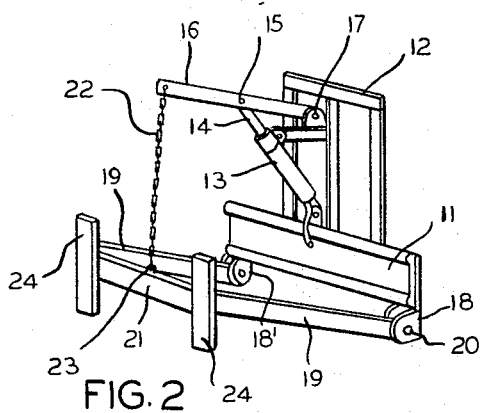
FIGURE 2 is a perspective view of the assembled device illustrating the arrangement of the component parts.

The horizontal bar 11 as shown in FIGURE 2, has a pair of linkage arms 19 pivotally attached at 20 to yolks 18, 18′. The front ends of the arms 19 are similarly pivoted to a pusher bar 21 extending longitudinally in a horizontal plane across the front of the vehicle 10. There is a chain means shown at 22 attached at 23 to the pusher-bar 21, and the other end of the chain is attached to the lifting bar 16. The chain may be similarly attached between the arms 19 and the lifting bar 16. The pusher-bar 21 is equipped with a pair of contact members 24, extending vertically therefrom as shown in FIGURE 2.

Obviously the device may be actuated by hydraulic, pneumatic, or manual power, the action of the piston within the cylinder 13 will determine how far the lifting bar 16 will raise, or lower the pusher-bar 21, to permit the contact members 24 to engage the vehicle being pushed.

Figure 3:
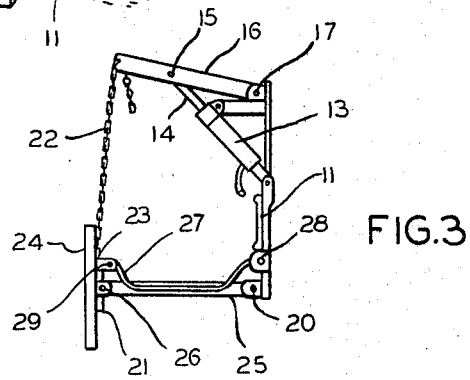
FIGURE 3 is a vertical cross-section view of a second embodiment of the assembled device in a lowered position.
Figure 5:
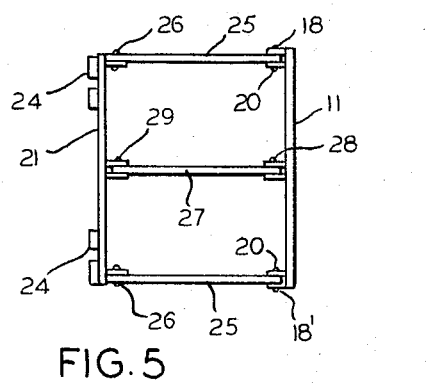
FIGURE 5 is a partial top, or plan view of the device shown in FIGURES 3 and 4, showing the hinged arrangement of the support members.
Figure 4:
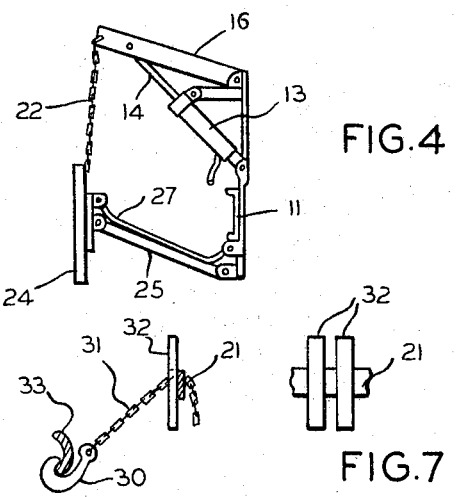
FIGURE 4 is a similar view of the device shown in FIGURE 3, but in a raised position.

To assure that the contact members 24 are maintained normal to the ground surface when the pusher-bar is raised and/or lowered the plane of the front face of the pusher-bar 21 is kept parallel to the mounting surface of the horizontal bar 11. In FIGURES 3, 4 and 5, I show a detailed alternative embodiment in which the pusher-bar 21 is pivotally supported at 26 to the arms 25.

Thus, the points 26 define a horizontal line. The point 29 and the line 26—26 defines a first plane. Similarly, the points 18 define a line which with the point 28 defines a second plane. The first plane is always parallel to the second plane since the distance between associated pivotal support points are equal. For example, the distances between points 26, 18 and 29, 28 are equal. The second plane is rigidly attached to the vehicle and this is fixed. The first plane can only be moved parallel thereto. The angle between the front face of pusher-bar and the first plane and the angle between the mounting face of the horizontal bar and the second plane are identical and are such that both faces are mounted normal to the ground. In this manner, the contact members 24 will remain in a substantially vertical position as shown in FIGURES 3 and 4, when the pusher-bar 21 is raised, or lowered.

Figures 6, 7:
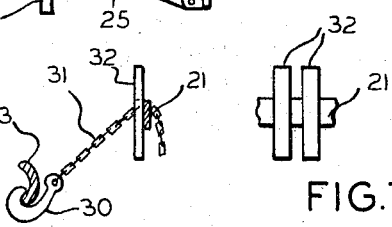
FIGURE 6, is a schematic view of an accessory consisting of a chain with a hook.
FIGURE 7 is a front view of a part of the device illustrating the pusher members spaced apart from one another to accommodate the chain shown in FIGURE 6.

In FIGURE 6, I show a hook 30 attached to the end of a chain 31, which chain may be disposed or clamped between the dual contact members shown at 32 in FIGURE 7, when the hook 30 is placed into engagement with the bumper of a vehicle which bumper is shown at 33. The raising of the pusher-bar 21 will permit the chain to raise the vehicle (not shown) to which the bumper 33 is attached.

From the above description, it will become apparent that the assembled device, constructed in a manner to be mounted onto the cross-bar of a vehicle, in any conventional manner, may be easily applied and removed, and as the pusher-bar is raised and lowered by whatever power the vehicle is equipped with, it will place the pusher-bar in the correct position to accomplish the purpose for which it is intended, whether the bumper on the vehicle being serviced is in a raised or lowered position, and although I have shown a specific construction and arrangement of the parts, I am fully cognizant of the fact that many changes may be made in the shape and contour of the parts and their arrangement without effecting their operativeness, and I reserve the right to make such changes without departing from the spirit of my invention, or the scope of the claims.

I claim:

1. A pushing device for pushing vehicles having bumpers which are different distances from the ground, said pushing device comprising a horizontal bar fixedly mounted to the front of a vehicle, a pusher bar that can be moved to various heights above the ground and positioned forward of said horizontal bar, means for selectively lifting and dropping said pusher bar, linkage means coupling said horizontal bar to said pusher bar, means for pivotally connecting said linkage means to said pusher bar, said pivotably connecting means defining a first plane, corresponding means for pivotably connecting said linkage means to said horizontal bar, said corresponding pivotably connecting means defining a second plane, the distances between said means and said corresponding means being equal whereby said first and said second planes are constantly parellel to each other, and the angle between said first plane and the front face of said pusher bar being identical with the angle between said second plane and a mounting face of said horizontal bar.

2. The pushing device of claim 1 wherein said linkage means comprises at least three arms.

3. The pushing device of claim 2 wherein said identical angles are equal to zero.

4. The pushing device of claim 1 wherein said mounting face of said horizontal bar is normal to the ground whereby the front face of said pusher-bar is maintained normal to the ground.

5. The pushing device of claim 2 wherein the means and the corresponding means for pivotably connecting a first two of said at least three arms comprise yoke means which define a horizontal line on said pusher-bar and a horizontal line on said horizontal bar respectively and wherein the means and the corresponding means for pivotably connecting said third linkage arm lies above said horizontal lines.

6. The pushing device of claim 2 wherein the means and the corresponding means for pivotably connecting a first two of said at least three arms comprise yoke means which define a horizontal line on said pusher-bar and a horizontal line on said horizontal bar respectively and wherein said means and corresponding means for pivotably connecting said third linkage arm lies below said horizontal lines.

7. The pushing device of claim 2 wherein the means and the corresponding means for pivotably connecting a first two of said at least three arms comprise yoke means which define a horizontal line on said pusher-bar and a horizontal line on said horizontal bar respectively and wherein said third linkage arm is U-shaped and extends from said horizontal bar to said pusher-bar at a level above the ground substantially the same as the level of said first and said second linkage arm.

8. The pushing device of claim 6 wherein said first and second linkage arms are pivotably coupled near the side ends of said horizontal bar and said pusher-bar and wherein said third linkage arm is located an equal distance from said first and said second linkage arm.

9. A device for pushing vehicles having bumpers which vary in distance from the ground comprising: a vertical support assembly that is attached to a vehicle, a pusher-bar that can be moved to varying positions with respect to the ground, a pair of arms spaced apart with the front ends thereof pivotally attached to said pusher-bar, the rear ends of said arms being pivotally associated with said vertical assembly, a centrally disposed link member pivotally attached to said pusher-bar at the center of said pusher-bar on one end and to the vehicle at the other end, whereby said pusher member retains its vertical position with respect to the ground, said arms and linkage extending forward from said vertical assembly and being disposed lower than the body of the vehicle adjacent the tires of the vehicle, one of said arms being attached to the one end of said pusher-bar and the other of said arms being attached to the other end, said arms being pivotally associated with said vertical support assembly, a lifting bar pivotally mounted on said vehicle, a cylinder being interposed between said lifting bar and said vertical support assembly, a reciprocating rod protruding out of one end of said cylinder, said rod being associated with said lifting bar, said cylinder having its other end associated with said horizontal bar, and a chain means attached at one end to said lifting bar and on the other end to said pusher-bar, whereby said lifting bar pivots when said rod of said cylinder reciprocates thereby changing the distance of said pusher-bar from the ground.

10. A device for pushing vehicles having bumpers which vary in distance from the ground and for lifting bumpers of vehicles comprising: a vertical pusher bar spaced in front of a motor vehicle; a pair of arms spaced apart and pivotally attached at the front end thereof to said pusher bar, the rear ends of said arms being pivotally mounted to said motor vehicle a centrally disposed link member pivotally attached to said pusher-bar at the center of said pusher-bar on one end and to the motor vehicle at the other end, whereby said pusher bar retains its vertical position with respect to the ground; a lifting bar pivotally associated with said motor vehicle; means for pivotally actuating said lifting bar; chain means connected at one end to said lifting bar and at the other end thereof to said pusher bar, whereby the pivotally actuating of said lifting bar controls the height of said pusher bar with respect to ground; and at least one hook member having one end associated with said pusher bar and having the gripping end thereof disposed to releasably grip the bumpers of vehicles to raise said bumpers simultaneously with the raising of said pusher bar.

References Cited

UNITED STATES PATENTS

| | | | |
|---|---|---|---|
| 2,919,142 | 12/1959 | Winget | 280—481 |
| 2,932,416 | 4/1960 | Kenyon | 214—86 |
| 2,986,827 | 6/1961 | Peterson | 37—144 |
| 2,998,965 | 9/1961 | Larson | 280—481 X |
| 3,060,696 | 10/1962 | Lang | 172—484 X |
| 3,116,797 | 1/1964 | Launder et al. | 172—484 |
| 3,175,313 | 3/1965 | Renahan | 37—42 |
| 3,204,352 | 9/1965 | Hughes | 172—484 X |
| 3,252,716 | 5/1966 | Gaterman | 280—481 X |

FOREIGN PATENTS 778,773    7/1957    Great Britain.

LEO FRIAGLIA, *Primary Examiner.*